United States Patent
Trim et al.

(10) Patent No.: US 11,222,276 B2
(45) Date of Patent: Jan. 11, 2022

(54) RESPONSE COLLABORATION AMONG MULTIPLE ARTIFICIAL INTELLIGENCE (AI) SYSTEMS

(71) Applicant: International Business Machines Corporation, Armonk, NY (US)

(72) Inventors: Craig M. Trim, Ventura, CA (US); Michael Bender, Rye Brook, NY (US); Kulvir Singh Bhogal, Fort Worth, TX (US); Jeremy R. Fox, Georgetown, TX (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 456 days.

(21) Appl. No.: 16/422,457

(22) Filed: May 24, 2019

(65) Prior Publication Data
US 2020/0372381 A1 Nov. 26, 2020

(51) Int. Cl.
*G06N 5/04* (2006.01)
*H04L 29/08* (2006.01)

(52) U.S. Cl.
CPC .............. *G06N 5/043* (2013.01); *H04L 67/10* (2013.01)

(58) Field of Classification Search
CPC ................................. G06N 5/043; H04L 67/10
See application file for complete search history.

(56) References Cited

U.S. PATENT DOCUMENTS

| | | | |
|---|---|---|---|
| 7,203,643 B2 | 4/2007 | Garudadri | |
| 7,720,674 B2 | 5/2010 | Kaiser | |
| 8,234,231 B2 | 7/2012 | Kelly | |
| 8,775,365 B2 | 7/2014 | Hatami-Hanza | |
| 9,049,259 B2 | 6/2015 | Rathod | |
| 9,262,553 B2 | 2/2016 | Ramakrishnan | |
| 9,390,087 B1 | 7/2016 | Roux | |

(Continued)

FOREIGN PATENT DOCUMENTS

CA 2505071 A1 10/2006

OTHER PUBLICATIONS

"AI based Collective Voice Control Collaboration among Audio Conference Participants", An IP.com Prior Art Database Technical Disclosure, Disclosed Anonymously, IP.com No. IPCOM000252776D, IP.com Electronic Publication Date: Feb. 8, 2018, 4 pages.

(Continued)

*Primary Examiner* — David Phantana-angkool
(74) *Attorney, Agent, or Firm* — Michael A. Petrocelli

(57) ABSTRACT

A method, system and computer program product for collaborating among multiple electronically communicating AI (Artificial Intelligence) devices for responding to a request includes detecting and identifying devices that are each communicable with a user and electronically communicating and interacting with their respective AI systems. An answer is generated, in response to receiving a request or an instruction by a user at a device of the identified devices, where the answer resulting from collaboration of the identified devices and their respective AI systems. A responding device is determined from the identified devices based on criteria, and a threshold for selecting the responding device. The threshold includes rating, in an order of importance, responding device scenarios for delivering the answer. One of the identified devices is selected to deliver the answer based on the criteria which includes meeting the threshold.

20 Claims, 11 Drawing Sheets

(56) References Cited

U.S. PATENT DOCUMENTS

| | | |
|---|---|---|
| 9,922,124 B2 | 3/2018 | Rathod |
| 9,959,028 B2 | 5/2018 | Rosenberg |
| 10,044,983 B1 | 8/2018 | Scanlon |
| 10,110,664 B2 | 10/2018 | Rosenberg |
| 2006/0173972 A1 | 8/2006 | Jung |

OTHER PUBLICATIONS

"Method and System for Enabling Self-Social interaction of Artificial Intelligence Devices", An IP.com Prior Art Database Technical Disclosure, Disclosed Anonymously, IP.com No. IPCOM000252787D, IP.com Electronic Publication Date: Feb. 9, 2018, 4 pages.

"Method and System for Providing a Dynamic Modelling Framework for an Artificial Intelligence Based Robotic Interviewer". An IP.com Prior Art Database Technical Disclosure, Disclosed Anonymously, IP.com No. IPCOM000256312D, IP.com Electronic Publication Date: Nov. 17, 2018, 3 pages.

"System and Method to Detect Question in Communications andPreemptive Answering", An IP.com Prior Art Database Technical Disclosure, Disclosed Anonymously, IP.com No. IPCOM000240790D, IP.com Electronic Publication Date: Mar. 2, 2015, 4 pages.

Bughin, et al., "Artificial Intelligence—The Next Digital Frontier?", McKinsey Global Institute, Discussion Paper, Jun. 2017, 80 pages.

Bushnell, Mona, "AI Faceoff: Siri vs. Cortana vs. Google Assistant vs. Alexa", businessnewsdaily.com, Jun. 29, 2018, 12 pages, <https://www.businessnewsdaily.com/10315-siri-cortana-google-assistant-amazon-alexa-face-off. html>.

Gebhart, Andrew, "Google Assistant is smarter than Alexa, study finds", clnet, Apr. 27, 2018, 3 pages, <https://www.cnet.com/news/study-finds-google-assistant-is-smarter-than-alexa/>.

Gesing, et al., "Artificial Intelligence in Logistics", DHL and IBM, white paper, 2018, 45 pages.

List of IBM Patents and Patent Applications Treated as Related. Filed Filed May 24, 2019. 2 pages.

Martin, James A., "Who's smartest—Alexa, Siri, Cortana, or Google Assistant?", Living the Tech Life, CIO, Apr. 27, 2017, 5 pages, <https://www.cio.com/article/3192139/whos-the-smartest-alexa-siri-cortana-or-google-assistant.html>.

Mell et al., "The NIST Definition of Cloud Computing", National Institute of Standards and Technology, Special Publication 800-145, Sep. 2011, 7 pages.

Ranj, Brandt, "We asked Siri, Alexa, and the Google Assistant 10 questions—here's which one is the smartest", Insider Picks, businessinsider.com, Mar. 9, 2018, 11 pages, <https://www.businessinsider.com/siri-alexa-google-assistant-which-is-smarter-2018-3>.

Tang, et al., "Learning to Collaborate for Question Answering and Asking", Proceedings of NAACL-HLT, New Orleans, Louisiana, Jun. 1-6, 2018, pp. 1564-1574.

Trim, et al., "Information and Data Collaboration Among Multiple Artificial Intelligence (AI) SYSTEMS", U.S. Appl. No. 16/422,506, filed May 24, 2019.

RESPONSE COLLABORATION AMONG MULTIPLE ARTIFICIAL INTELLIGENCE (AI) SYSTEMS

BACKGROUND

The present disclosure relates to a method and system for collaborating across Artificial Intelligence (AI) systems, and their respective AI front-end devices at a location.

AI systems with front-end devices at a location can assist users at the location by providing information, answers to questions, and responses to inquiries. When a plurality of AI systems have front-end devices at a location, the devices can have proprietary or singular operating systems and technology, and a device and their corresponding AI system, does not cooperate with another device and corresponding AI system. In one example, current technology does not allow for cross AI systems, where multiple AI systems each with corresponding devices are at a location and within range of detecting audible questions from one or more users, and any AI device and corresponding system can generate a response. Typically, in one example, an AI system responds to a question based on the physical proximity of a user or person to the device, and does not include cooperation with other AI systems whether to generate an answer or to provide the answer to the user.

Additionally, in a multi-AI device situation, a device that received the request may not be the best device to respond with an answer. For instance, another device and AI system (e.g., a second AI system) may be better able to answer the question, or another device associated with a second AI system/platform may be in a more advantageous location. For example, another AI device (other than the AI system and device (or first device) that received the question or request) may be closer to a user, or closer to a new location of the user who has moved since initiating the request or question, or another device may be in the proximity of other users, and in a better or more preferable position to respond to the question or request.

SUMMARY

The present disclosure recognizes the shortcomings and problems associated with different AI systems each generating answers to the same question or request by a user. In one example, each AI system can have different back-end training. In another example, it is not known which AI system and associated device has the best answer. Thus, one problem with having multiple AI systems in a common location is the lack of communication and cooperation between the devices and respective systems. Such AI systems can each have different operating systems and learning techniques or processes, and an AI system can automatically be learning based on the usage pattern of a particular device. The learning pattern of an AI systems can be dependent on, for example, different types of parameters which were considered during the learning process, types of scenarios which were addressed by the device, and an amount of learning, as well as other parameters. This can result in different devices of the same category (different AI systems) learning differently when the learning parameters are different, and/or when the scenarios addressed are different, or when an AI algorithm is different. Therefore, in any multi-AI device scenario, there is a need for a method and system by which the AI devices, and respective AI systems, can collaborate with each other and provide a best possible decision and answer which can be identified by cooperating AI devices.

The method and system of the present disclosure provides for collaboration and cooperation between multiple AI systems to generate a response that is superior to any one device and its corresponding AI system generating a response as a singular unit. The response is superior because the present method and system can collaborate between multiple AI systems to generate a best answer of multiple AI systems.

Additionally, the embodiments of the present invention enable, in a multi-AI device scenario, responding to a request by a device and corresponding AI system which is best situated to respond, which can be based on location of one of the devices, or expertise of a device/AI system. Thereby, once an answer is determined by the collaboration of AI systems according to the present disclosure, the selection of the responding device is optimized according to the embodiments of the present disclosure. Multiple devices can be engaged in determining an answer to a request, and users/individuals may have moved from their original location when initiating the request while waiting for a response from the system, that is, one or more users may have moved. Thus a device is selected based on assessing multiple response scenarios, which can include determining which device and AI system is best positioned or suited to respond, and/or which device is at the best location for responding.

AI Response Collaboration

In one aspect according to the invention, a method for collaborating among multiple electronically communicating AI (Artificial Intelligence) devices for responding to a request includes detecting and identifying devices that are each communicable with a user and electronically communicating and interacting with their respective AI systems. The method includes generating an answer, in response to receiving a request or an instruction by a user at a device of the identified devices, the answer resulting from collaboration of the identified devices and their respective AI systems. The method includes determining a responding device from the identified devices based on a criteria, the criteria including a location of a requesting user, a location of one of the identified devices, and a threshold for selecting the responding device, the threshold including rating, in an order of importance, responding device scenarios for delivering the answer. The method includes selecting one of the identified devices to deliver the answer based on the criteria which includes meeting the threshold, and responding, using the selected device, by generating an audible communication with the answer which communicates a response to the user.

In another aspect according to the present invention, a system for collaborating among multiple electronically communicating AI (Artificial Intelligence) devices for responding to a request, the system comprising: a computer system comprising: a computer processor, a computer-readable storage medium, and program instructions stored on the computer-readable storage medium being executable by the processor, to cause the computer system to: detect and identify devices that are each communicable with a user and electronically communicating and interacting with their respective AI systems; generate an answer, in response to receiving a request or an instruction by a user at a device of the identified devices, the answer resulting from collaboration of the identified devices and their respective AI systems; determine a responding device from the identified devices based on a criteria, the criteria including a location of a requesting user, a location of one of the identified devices, and a threshold for selecting the responding device, the threshold including rating, in an order of importance, responding device scenarios for delivering the answer; select one of the identified devices to deliver the answer based on the criteria which includes meeting the threshold; and respond, using the selected device, by generating an audible communication with the answer which communicates a response to the user.

In another aspect according to the present invention, a computer program product for collaborating among multiple electronically communicating AI (Artificial Intelligence) devices for responding to a request, the computer program product comprising a computer readable storage medium having program instructions embodied therewith, wherein the computer readable storage medium is not a transitory signal per se, the program instructions executable by a computer to cause the computer to perform a method, comprising: detecting and identifying devices that are each communicable with a user and electronically communicating and interacting with their respective AI systems; generating an answer, in response to receiving a request or an instruction by a user at a device of the identified devices, the answer resulting from collaboration of the identified devices and their respective AI systems; determining a responding device from the identified devices based on a criteria, the criteria including a location of a requesting user, a location of one of the identified devices, and a threshold for selecting the responding device, the threshold including rating, in an order of importance, responding device scenarios for delivering the answer; selecting one of the identified devices to deliver the answer based on the criteria which includes meeting the threshold; and responding, using the selected device, by generating an audible communication with the answer which communicates a response to the user.

AI Request Collaboration

In other aspects according to the present disclosure, a method for collaborating among multiple electronically communicating AI (Artificial Intelligence) devices includes: detecting and identifying devices that are each communicable with a user and electronically communicating and interacting with their respective AI systems; in response to receiving a request or an instruction by a user at a device of the identified devices, each of the devices generate an answer to the request or instruction, wherein each of the devices are communicating with their respective AI systems; rating each of the generated answers from each of the identified AI systems and their corresponding devices, respectively; defining a threshold for a final answer based on a plurality of factors; selecting as the final answer, the answer meeting the threshold; and responding, using one of the identified devices, which, for example, can be the device which received the request, by generating an audible communication with the final answer which communicates a response to the user.

In another aspect according to the present disclosure, a system for collaborating among multiple electronically communicating AI (Artificial Intelligence) devices includes detecting and identifying devices that are each communicable with a user and electronically communicating and interacting with their respective AI systems includes a computer system comprising: a computer processor, a computer-readable storage medium, and program instructions stored on the computer-readable storage medium being executable by the processor, to cause the computer system to: detect and identify devices that are each communicable with a user and electronically communicating and interacting with their respective AI systems; in response to receiving a request or an instruction by a user at a device of the identified devices, each of the devices generate an answer to the request or instruction, wherein each of the devices are communicating with their respective AI systems; rate each of the generated answers from each of the identified AI systems and their corresponding devices, respectively; defining a threshold for a final answer based on a plurality of factors; select as the final answer, the answer meeting the threshold; and respond, using one of the identified devices, which, for example, can be the device which received the request, by generating an audible communication with the final answer which communicates a response to the user.

In another aspect according to the present disclosure, a computer program product for collaborating among multiple electronically communicating AI (Artificial Intelligence) devices includes detecting and identifying devices that are each communicable with a user and electronically communicating and interacting with their respective AI systems includes the computer program product comprising a computer readable storage medium having program instructions embodied therewith. The computer readable storage medium is not a transitory signal per se, and the program instructions are executable by a computer to cause the computer to perform a method, comprising: detecting and identifying devices that are each communicable with a user and electronically communicating and interacting with their respective AI systems; in response to receiving a request or an instruction by a user at a device of the identified devices, each of the devices generate an answer to the request or instruction, wherein each of the devices are communicating with their respective AI systems; rating each of the generated answers from each of the identified AI systems and their corresponding devices, respectively; defining a threshold for a final answer based on a plurality of factors; selecting as the final answer, the answer meeting the threshold; and responding, using one of the identified devices, which, for example, can be the device which received the request, by generating an audible communication with the final answer which communicates a response to the user.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. The drawing are discussed forthwith below.

DETAILED DESCRIPTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

AI Request Collaboration

Figure 1:
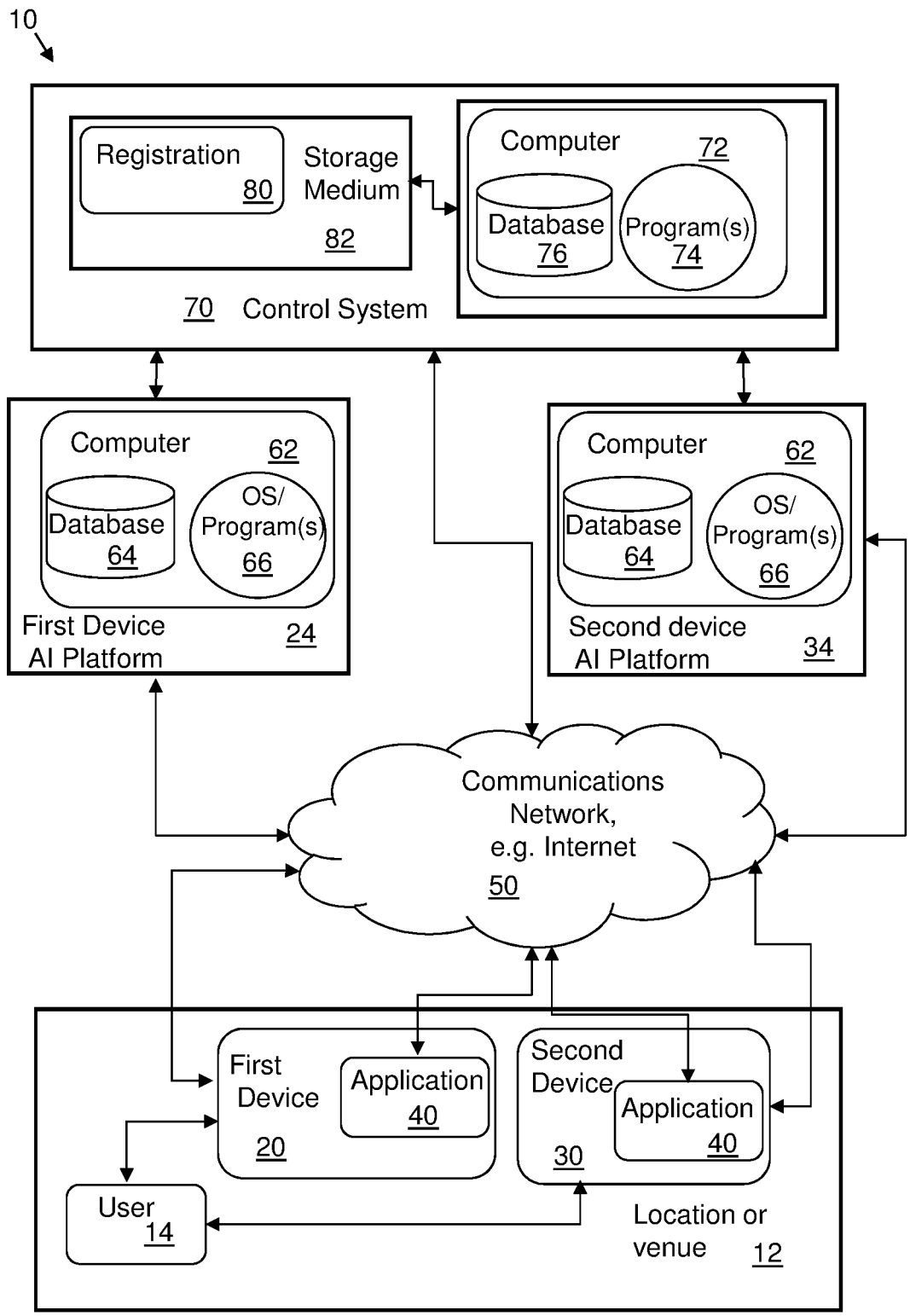
FIG. 1 is a schematic block diagram illustrating an overview of a system and methodology for collaborating among multiple electronically communicating AI (Artificial Intelligence) devices, according to an embodiment of the invention.
Figure 2:
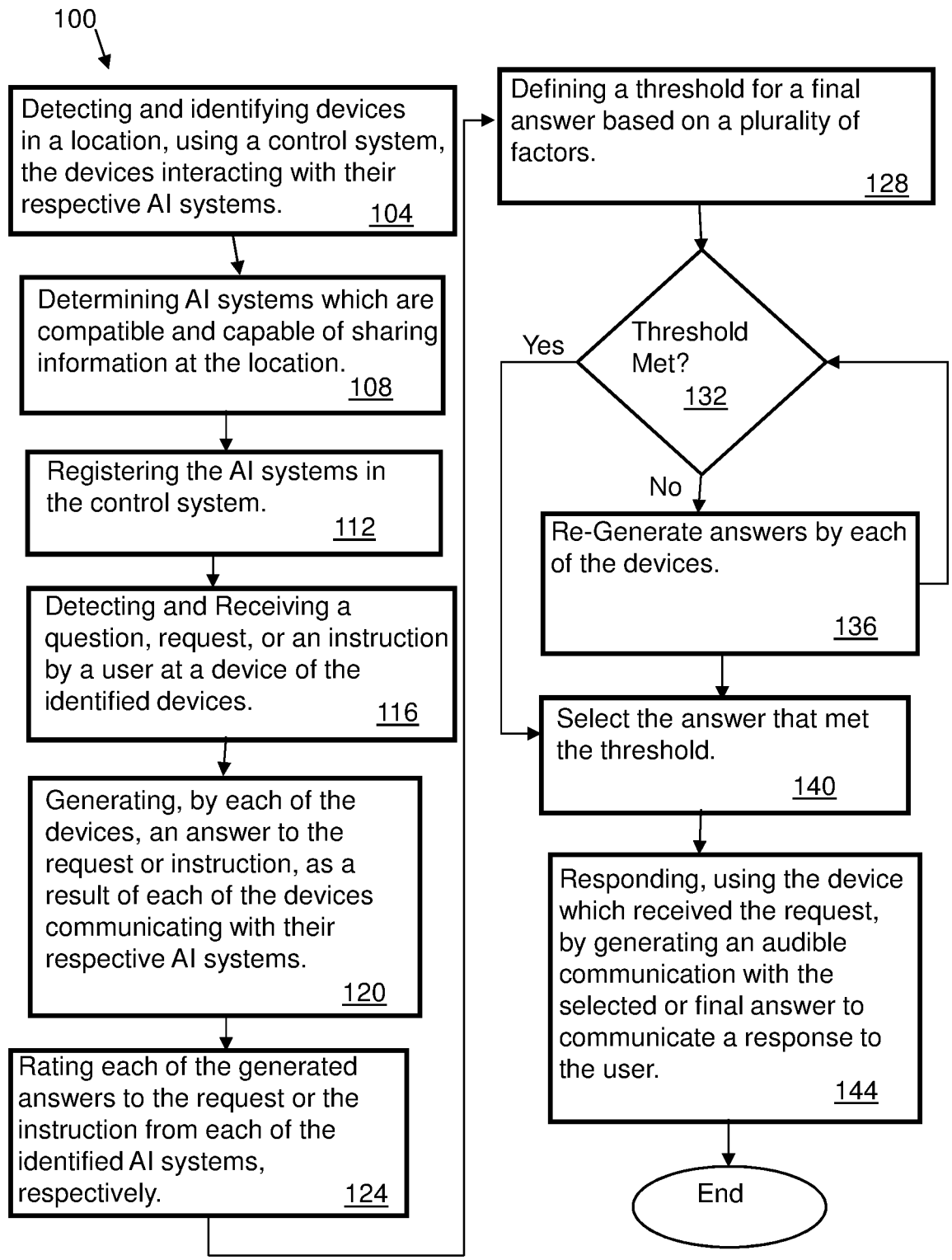
FIG. 2 is a flow chart illustrating a method, implemented using the system shown in FIG. 1, for collaborating among multiple electronically communicating AI (Artificial Intelligence) devices, according to an embodiment of the present invention.

Referring to FIGS. 1 and 2, a method 100 (FIG. 2) with reference to a system 10 (FIG. 1) according to an embodiment of the present disclosure is provided for collaborating among multiple electronically communicating AI (Artificial Intelligence) devices for generating an answer to a request. Multiple AI devices, first device 20 and second device 30, as shown in FIG. 1, communicate with AI systems, respectively, first AI system platform 24, and second AI system platform 34, operating on respective platforms. The platforms are enabling for the AI systems and the devices that employ them. It is understood that the first and second AI systems are shown as an embodiment of a plurality of AI systems and devices related to those system as an example (for simplicity of explanation in this specification), and a greater number of devices and related systems can be employed.

Also, referring to FIG. 1, the first and second AI platforms 24, 34, respectively, include a computer 62, database 64, and operating systems and programs 66. These features are shown generically for both systems.

The method 100 according to an embodiment of the present disclosure, can be incorporated in one or more computer programs or an application and stored on an electronic storage medium. It is envisioned that the application can access all or part of instructions necessary to implement the method of the present disclosure. The program or application can communicate with a remote computer system via a communications network 50, e.g., the Internet, and access data, and cooperate with program(s) stored on the remote computer system. In the embodiment of the disclosure shown in FIGS. 1 and 2, the method 100 is incorporated in an application 40 stored on the first and second devices 20, 30, respectively. The application can communication with a control system 70 via a communications network 50. The control system 70 includes a computer 72 having a database 76 and one or more programs 74. In the embodiment of the disclosure shown in FIG. 1, the application 40 communicates with the control system 70 and the one or more programs 74. The control system includes the computer 72 which also has access to the database 76. The control system 70 includes a storage medium 82 for maintaining a registration 80 of AI systems which are compatible for collaboration. In an embodiment, the method and system which incorporates the present disclosure includes the control system (generally referred to as the back-end) in combination and cooperation with a front end of the method and system, which is the application. The application is stored on a device and can access data and additional programs at a back end of the application.

Referring to FIG. 2, the method 100 includes detecting and identifying devices in a location 12 that are each communicable with a user 14. The devices are electronically communicating and interacting with their respective AI systems, as in block 104. Referring to FIG. 1, the user 14 in the location 12 can ask a question, make a request, or give an instruction, audibly, to the first and second devices 20, 30, in combination or singularly. The control system is in communication with the first and second devices and the application 40 on each of the devices. In another example, a plurality of users can be at the location and one or more users can ask a question. In the present example, one user 14 is shown for illustration, however, other users can be at the location.

The control system determines AI systems which are compatible and capable of sharing information at the location, as in block 108. The AI systems can be registered using the control system. Registration can include a make and model of the devices, or an operating system, so that the control system can assess the AI system for compatibility. Such registration can be initiated by a user, or can be automatically driven based on system compatibility. Registering the AI systems using the control system enables detecting of the request or question at one or more of the registered AI systems using the devices, respectively.

The control system registers 80 the AI systems and stores the information of registered devices and corresponding AI systems in the storage medium 82 of the control system 70, as in block 112.

Additionally, regarding registration of multiple AI systems, the device that received the instruction or request, can be considered a first AI system, and can communicate with another device and its AI system, which can be considered a second AI system. Such second systems can be considered secondary systems, and the first AI system can communicate with a plurality of secondary AI systems. The control system can register the secondary systems. The registration of the first AI system and the secondary systems can include registering the AI system and its associated device or devices.

In response to receiving a question, request, or an instruction 304 (see FIG. 4) by a user at a device of the identified devices, as in block 116, each of the devices generate an answer 308 (see FIG. 4) to the question, request or instruction (as in block 120), as a result of each of the devices communicating with their respective AI systems. In one example, a device detects and receives an audible question by a user, collaborates with other AI devices and systems for an answer or a best answer, and initiates answering the question using its respective AI system.

The device that received the instruction or request, can be considered a first AI system, and can communicate with another device and its AI system, which can be considered a second AI system. In another example, the first AI system can communicate with a plurality of secondary AI systems. The first AI system can generate an answer to the request or instruction and initiate answers from other AI systems, which can be referred to as secondary systems. The generation of answers or initiating generating answers by all the systems can be done iteratively resulting in permutations of answers. Further, variations of the question, request or instruction can be initiated resulting in variations of answers.

The method, using the control system, rates each of the generated answers 312 (see FIG. 4) to the request or the instruction from each of the identified AI systems, respectively, as in block 124. The rating can include, in one example, how many iterations an answer has undergone, to determine a set number of iterations, or to determine a new interaction is available and assess the answer. For example, an answer can be re-calculated, and a determination made if a better answer is received. Also, the rating can include determining when additional data is available, and re-calculating or re-generating an answer, and thus the re-generated answer has a higher rating as a result of incorporating additional data and/or a more refined search. Also, a higher rating can result from, for example, having undergone a set number of iterations. Also, in another example, a rating can be determined from determining a quality or veracity or trustworthiness of an answer, that is, receiving a higher rating for a higher determined quality or veracity. Further, the method or system can rank a confidence level of any one answer, group of answers, or combined answer, and use the confidence level to provide a single solution to the questions, or request.

The method includes using the control system to define a threshold for a final answer 324 (see FIG. 4) based on a plurality of factors, as in block 128. The factors can include, for example, similar factor as for determining ratings as discussed above. Further examples for factors in determining a threshold can include determining whether additional data is accessible for generating an answer. When no more data is available and/or accessible, determining that the threshold has been met. When more data is available and accessible for analysis, the threshold has not been met and more analysis can be initiated, thereby resulting in a re-generated or updated answer 316. This process can continue for as many iterations 315 as there is additional data, or can continue for a set number of iterations 315.

The method determines whether the threshold 320 is met at block 132. When the threshold is not met, the method continues to block 136 to re-generate or update answers by each of the devices. The method includes updating or regenerating an answer or answer to the question or request using the additional data. The threshold, in one example can include determining that no additional data for re-generating or reassessing for an updated answer is available.

Figure 4:
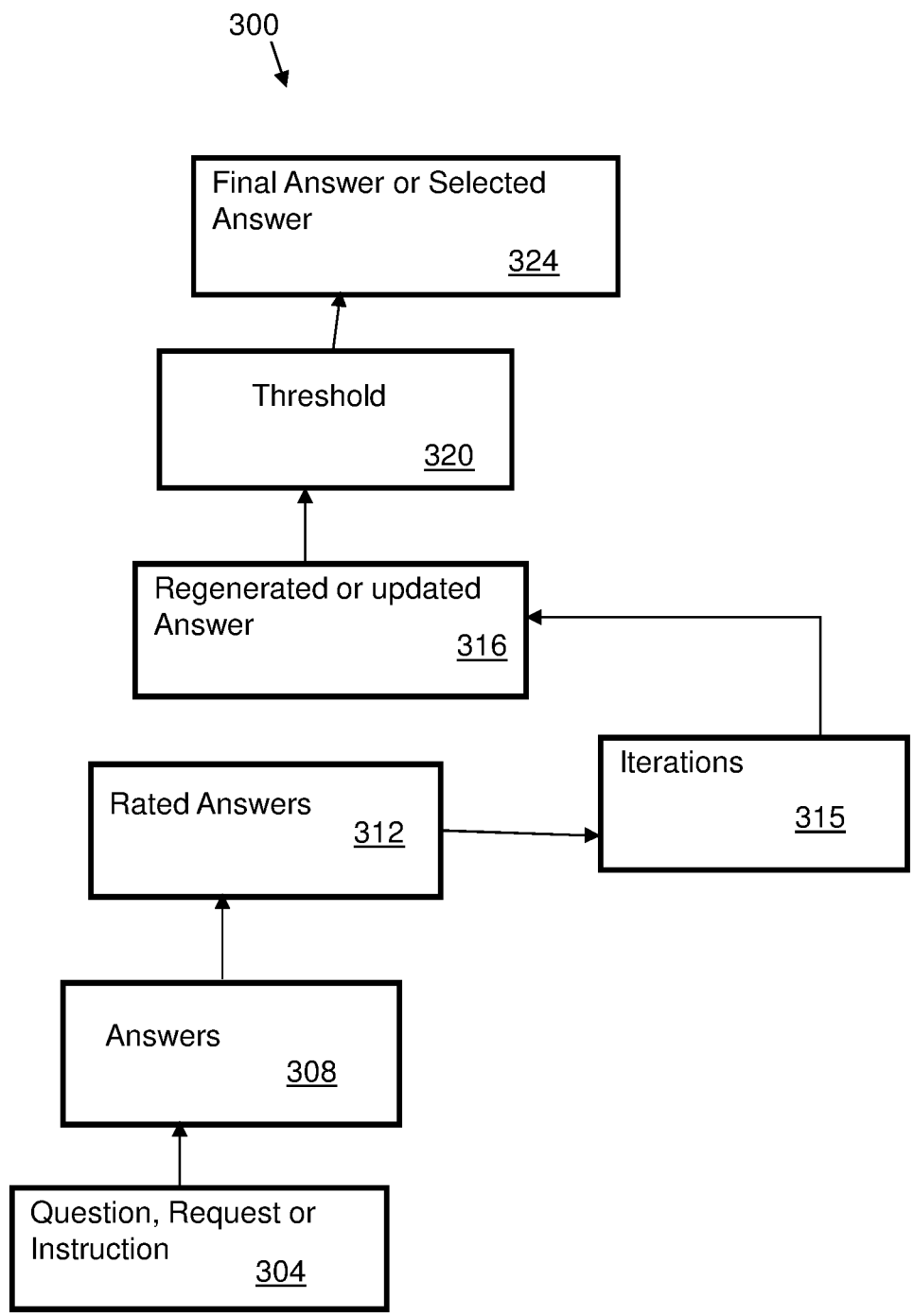
FIG. 4 is an instructional and functional block diagram illustrating features of the present invention in association with the embodiments shown in FIGS. 1-3, for collaborating among multiple electronically communicating AI (Artificial Intelligence) devices.

When the threshold is met, the method proceeds to block 140 to select the answer that met the threshold as a final answer or selected answer 324 (see FIG. 4). The method, using the control system, responds to the request or instruction, using the device which received the request, using audible capabilities of the device. The device, via the control system, responds by generating an audible communication with the selected answer (or referred to as the final answer) which communicates a response to the user, as in block 144.

In another embodiment, the method 100 can determine a location of the device of the identified devices which received the request, and respond using one or more devices in a closest geographical proximity to the location of the device which received the request. This can be the same device which received and initiated the request, but as explained above, can also be another device in the vicinity of the location of the device that received the request.

In another embodiment, the method can determine a location of the user who initiated the request at the device and which received the request. Such user location can be determined, with permission of the user, by a user device, e.g., mobile device, the user has on their person, and using GPS (Global Positioning System), or alternatively or in conjunction with, a short distance communication. The method initiates a response using one or more devices in a closest geographical proximity to the location of the user when the request was received.

Figure 3:
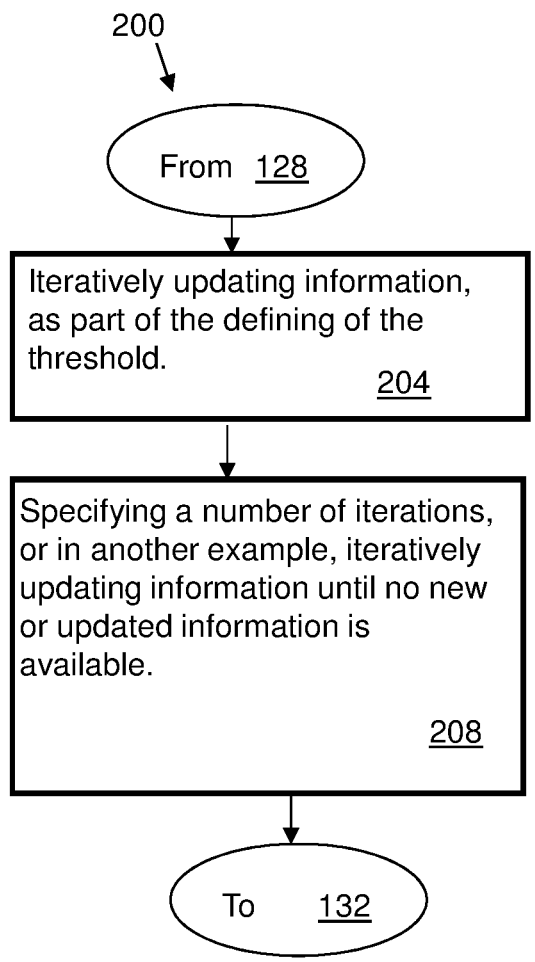
FIG. 3 is a flow chart illustrating another method continuing from the method shown in FIG. 2, for collaborating among multiple electronically communicating AI (Artificial Intelligence) devices.

Referring to FIG. 3, another embodiment includes a method 200 following from block 128 of the method 100 (of FIG. 2). The additional and alternative method 200 includes iteratively updating information, as part of the defining of the threshold. The updating is related to the request or the instruction and the method iteratively re-generates answers, respectively, from all the identified devices, as in block 204. The iterations, including additional information and generating updated or re-generated answers, can continue for a specified number of iterations, or in another example, until no additional information or new information is detected from each of the AI systems, as in block 208. Thus, a threshold can be defined, in one example, as a specified number of iterations, or in another example, until no additional information or new information is detected. Thereby, reaching or meeting the threshold results in a final answer for the iteratively updated or re-generated answers.

The method 200 returns to block 132 of the method 100 (of FIG. 2) after block 208. Block 132, as described above, determines if the threshold is met.

In one embodiment of the present disclosure, a first AI system which receives the request or instruction, can electronically initiate information requests to secondary AI systems. The first AI system, including first device 20 and first device AI platform 24, being part of the system 10 and method 100 of the present disclosure. The AI systems can be defined as a group, and use the answers from the secondary AI systems to determine additional questions. The secondary systems can be illustrated and represented by the second device 30 and second device AI platform 34. After reviewing the permutations of questions and responses, the first AI system ranks the confidence level of any combined answer to provide a single solution to the user or person initiating the question by providing the single solution to a device, for example, the device that received the request, and initiating an audible reply.

As described above in embodiments of the present disclosure, the method and systems of the embodiments described herein can share knowledge between multiple IoT (Internet of Things) enabled smart devices linked to multiple AI engines or systems by identifying devices that can share data, and requesting each device to generate an answer. Based on the available response and a highest rated answer, the method and system includes re-generating an answer by repeating questioning to the AI system with additional information from previous responses until no new information is available to iterate through the system. The previous responses can include stored answers to similar questions, stored by the respective AI systems, for instance in a database. The method and system then determines the location of the original requester(s), and/or determines the device which received the question, and responds the question with the answer using a device.

In one example, the embodiments of the present disclosure can include where two people are at home and one of the persons asks a question received by a device associated with one of three AI systems/devices. The question could be, for example, how to cook something, a specific recipe, or baking recipe, or a questions about traffic to a location, or weather at a location. In the example of a recipe, a refrigerator in the house on one AI system can have a list of items in the refrigerator, and another AI system can have a preferred recipe. Cooperation between the two AI systems, as in the embodiments of the present disclosure, can provide an answer to the question of—'do I have the ingredients for my favorite recipe'. The present disclosure provides a technique for collaboration and cooperation between multiple AI systems, and avoids receiving a message from one systems that does not have all the necessary information for an answer, that the system does not have enough information to answer the question.

As discussed above in embodiments of the present disclosure, a computer enabled system and method can generate an answer from an AI system by identifying registered devices that can be used to share information to respond to a request. The system and method can communicate with one or more registered devices or systems to respond to the original request or question, and iterate the question through the devices with the additional information. A response is communicated based on the highest level of confidence from the systems. The response can be determined by repeating the request with multiple levels of combinations and permutations to generate responses having higher levels of confidence, and selecting the answer with the highest level of confidence or reaching a threshold. In another example, the system and method provide an answer after a specified number of iterations for generating an answer with each iteration adding data or information regarding the questions.

AI Response Collaboration

Figure 5:
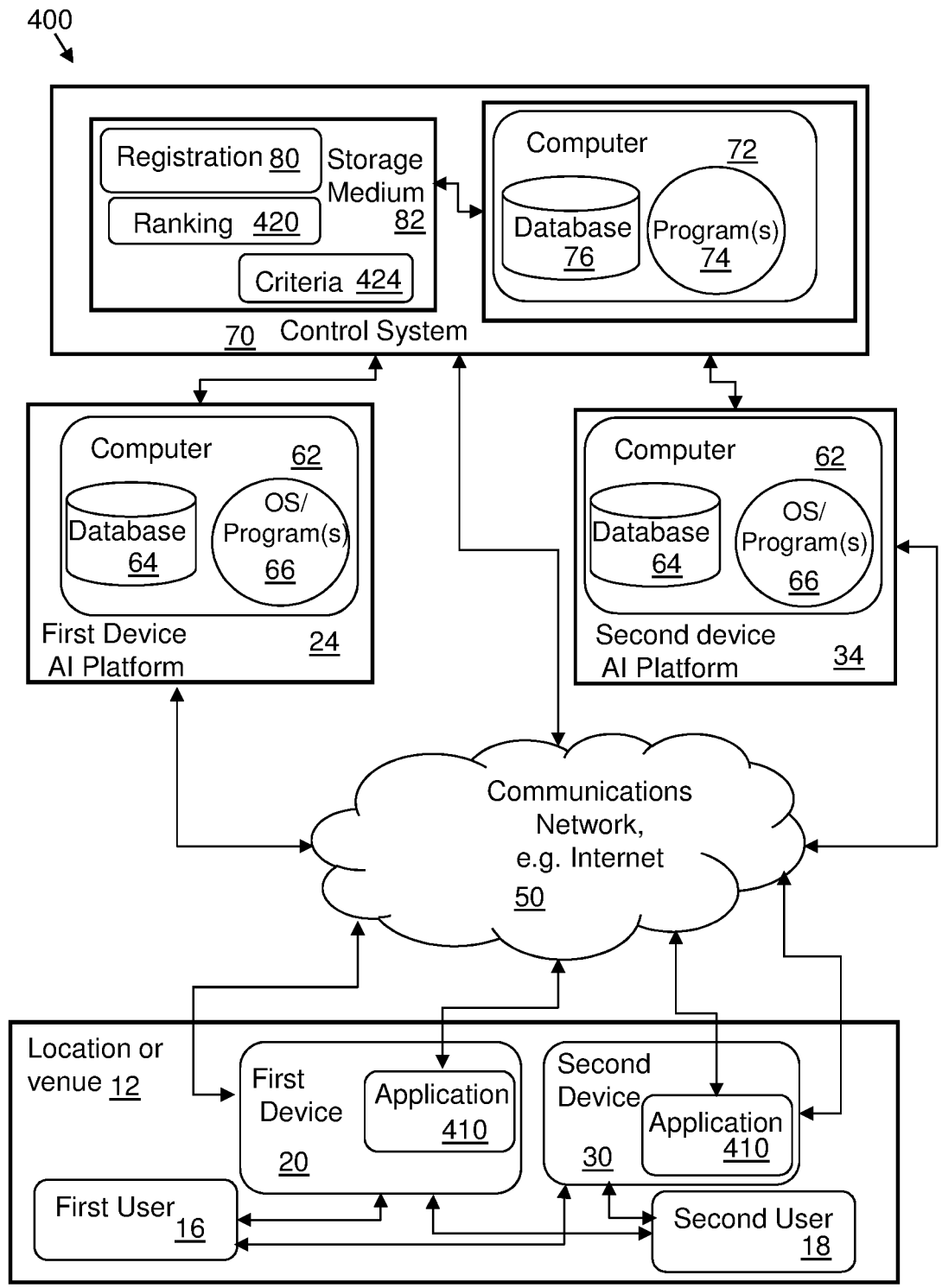
FIG. 5 is a schematic block diagram illustrating an overview of a system and methodology for collaborating among multiple electronically communicating AI (Artificial Intelligence) devices, according to another embodiment of the invention.
Figure 6:
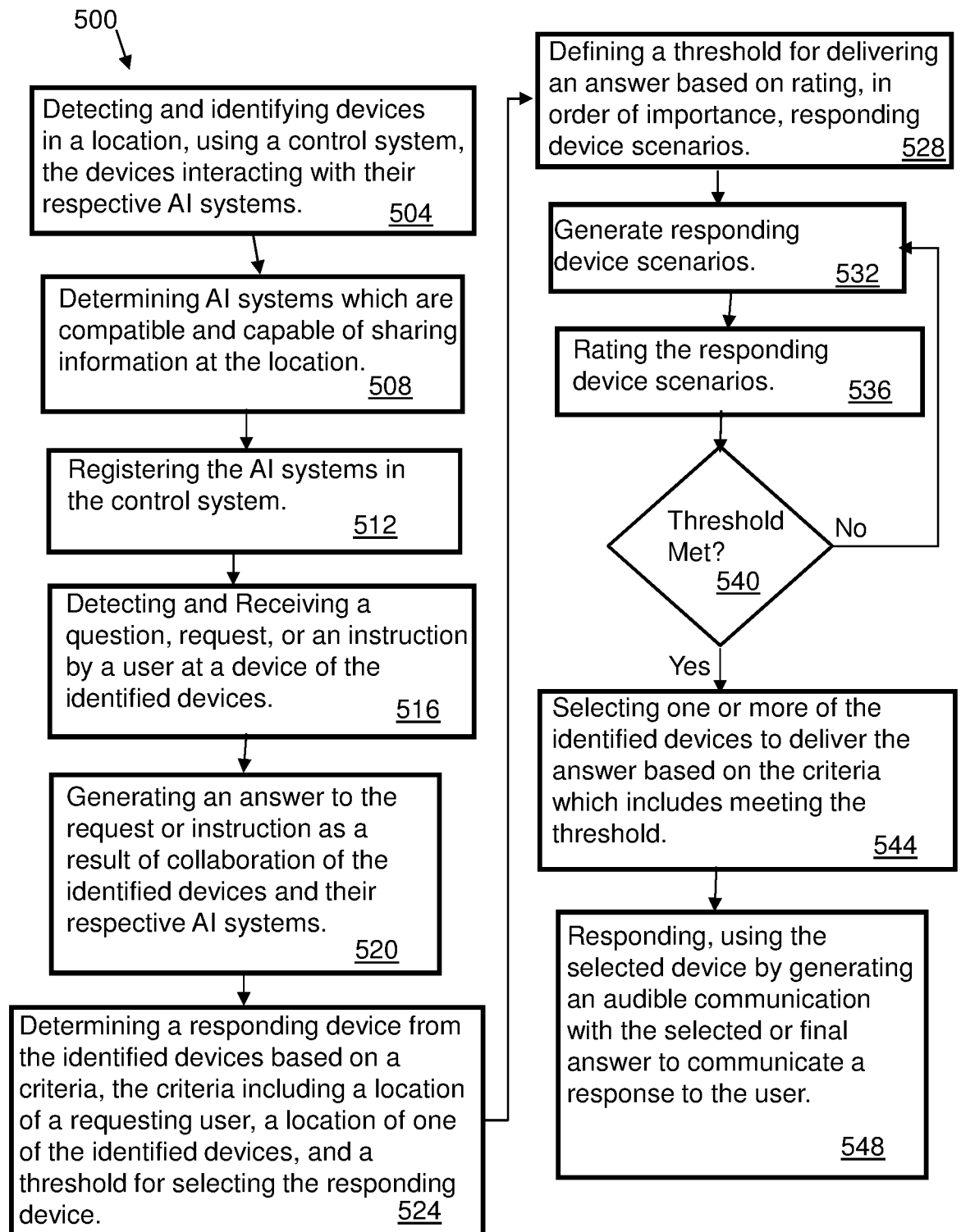
FIG. 6 is a flow chart illustrating a method, implemented using the system shown in FIG. 1, for collaborating among multiple electronically communicating AI (Artificial Intelligence) devices, according to another embodiment of the invention.

In another embodiment according to the present disclosure, referring to FIGS. 5 and 6, a method 500 (FIG. 6) with reference to a system 400 (FIG. 5) is provided for collaborating among multiple electronically communicating AI (Artificial Intelligence) devices for responding to a request. The multiple AI devices, the first device 20 and the second device 30, as shown in FIG. 1, communicate with the AI systems, respectively, first AI system platform 24, and second AI system platform 34, operating on respective platforms. The devices and AI systems/platforms of FIG. 1 and the embodiments of the disclosure described above are incorporated into the present embodiments shown in FIGS. 5, 6, and 7.

The method 400 according to an embodiment of the present disclosure, can be incorporated in one or more computer programs or an application and stored on an electronic storage medium. It is envisioned that the application can access all or part of instructions necessary to implement the method of the present disclosure. The program or application can communicate with a remote computer system via a communications network 50, e.g., the Internet, and access data, and cooperate with program(s) stored on the remote computer system. In the embodiment of the disclosure shown in FIGS. 5 and 6, the method 400 is incorporated in an application 410 stored on the first and second devices 20, 30, respectively. The application can communication with a control system 70 via a communications network 50. Similar to the embodiments shown in FIGS. 1 and 2, the control system 70 includes a computer 72 having a database 76 and one or more programs 74. In the embodiment of the disclosure shown in FIG. 1, the application 40 communicates with the control system 70 and the one or more programs 74. The control system includes the computer 72 which also has access to the database 76. The control system 70 includes a storage medium 82 for maintaining a registration 80 of AI systems which are compatible for collaboration. In an embodiment, the method and system which incorporates the present disclosure includes the control system (generally referred to as the back end) in combination and cooperation with a front end of the method and system, which is the application. The application is stored on a device and can access data and additional programs at a back end of the application.

Referring to FIG. 6, a method 500 according to an embodiment of the disclosure, some features of the present embodiment are similar to the embodiment of the disclosure of method 100 shown in FIG. 2. The method 500 includes detecting and identifying devices in a location 12 that are each communicable with a first user 16 and a second user 18. The devices are electronically communicating and interacting with their respective AI systems, as in block 504. Referring to FIG. 5, the first user 16 or the second user 18 in the location 12 can ask a question, make a request, or give an instruction, audibly, singularly and/or in combination, to the first and second devices 20, 30, singularly to a device or in combination. The control system is in communication with the first and second devices and the application 40 on each of the devices. In another example, a plurality of users can be at the location and one or more users can ask a question. In the present example, two users 16, 18 are shown for illustration, however, other users can be at the location.

The control system determines AI systems which are compatible and capable of sharing information at the location, as in block 508. The AI systems can be registered using the control system. Registration can include a make and model, or an operating system, so that the control system can assess the AI system for compatibility. Such registration can be initiated by a user, or can be automatically driven based on system compatibility. Registering the AI systems using the control system enables detecting of the request or question at one or more of the registered AI systems using the devices, respectively.

The control system registers 80 the AI systems and stores the information of registered devices and corresponding AI systems in the storage medium 82 of the control system 70, as in block 512.

Additionally, regarding registration of multiple AI systems, the device that received the instruction or request, can be considered a first AI system, and can communicate with another device and its AI system, which can be considered a second AI system. Such second systems can be considered secondary systems, and the first AI system can communicate with a plurality of secondary AI systems. The control system can register the secondary systems. The registration of the first AI system and the secondary systems can include registering the AI system and its associated device or devices. In one example devices can be associated with users, with the user's consent and approval, to identify a user and an associated device, for example, family members, or a group. In one example, non-registered devices and associated users will not be able to receive a response from the system at a non-registered device.

In response to receiving a question, request, or an instruction 604 (see FIG. 7) by a user at a device of the identified devices, as in block 516, an answer 608 (see FIG. 7) in generated resulting from collaboration of the identified devices and their respective AI systems, as in block 520. In one example, a device detects and receives an audible question by a user, collaborates with other AI devices and systems to generate an answer or a best answer, and initiates answering the question using its respective AI system.

The device that received the instruction or request, can be considered a first AI system, and can communicate with another device and its AI system, which can be considered a second AI system. In another example, the first AI system can communicate with a plurality of secondary AI systems. The first AI system, including first device 20 and first device AI platform 24, being part of the system 10 and method 100 of the present disclosure. The first AI system can generate an answer to the request or instruction and initiate answers from other AI systems, which can be referred to as secondary systems. The secondary systems can be illustrated and represented by the second device 30 and second device AI platform 34. The generation of answers or initiating generating answers by all the systems can be done iteratively resulting in permutations of answers. Further, variations of the question, request or instruction can be initiated resulting in variations of answers.

Determining a responding device from the identified devices based on criteria, as in block 524. The criteria including a location of a requesting user, a location of one of the identified devices, and a threshold for selecting the responding device, as in block 528. The threshold including rating, in an order of importance, responding device scenarios for delivering the answer, as in block 528.

The method includes using the control system to define a threshold for selecting or accepting a response scenario based on a plurality of factors, as in block 528. Examples for factors in determining a threshold can include determining a requesting user is in the proximity of the device that received the request. In another example, a factor can include whether the requesting user is moving or has moved locations, and when the requesting user is in proximity to another device.

In another example, a factor can include when multiple uses initiate a request, and determining which device or devices respond to the request. Such a response can be using one device or multiple devices based on the location or locations of one or more of the requesting users.

Figure 7:
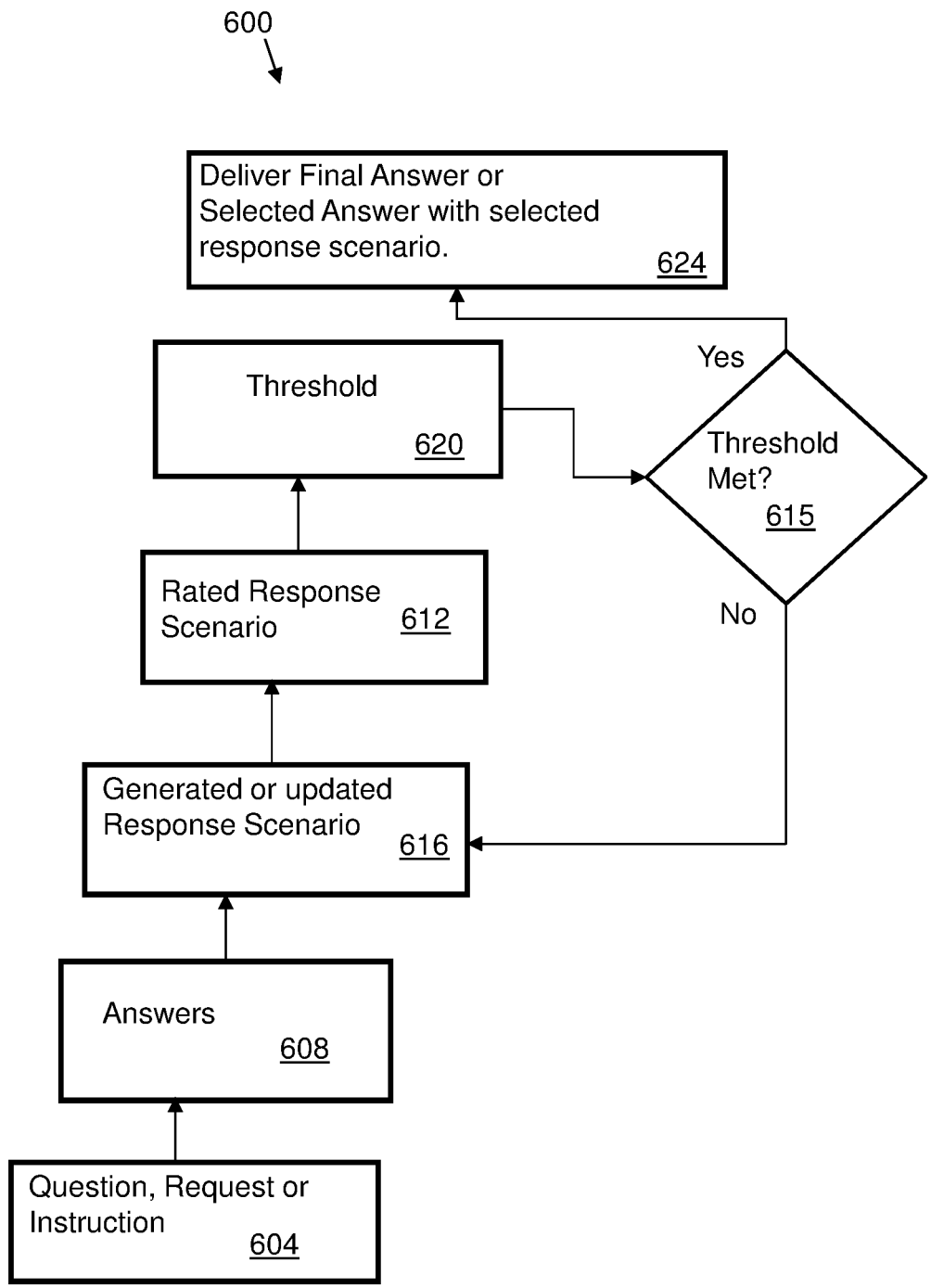
FIG. 7 is an instructional and functional block diagram illustrating features of the present invention in association with the embodiments shown in FIGS. 1-3, for collaborating among multiple electronically communicating AI (Artificial Intelligence) devices.

The method includes generating responding device scenarios, as in block 532. The method further includes rating the responding device scenarios as in bock 536. Reference is made to FIG. 6 and FIG. 7. The method, using the control system, generates response scenarios 616 and rates each of a plurality of responding device scenarios 612. The generated response scenarios 616 to the request or the instruction from each of the identified AI systems, respectively, is analyzed to determine if the threshold 620 is met (block 615 when referring to FIG. 7. The criteria including responding device scenarios and the threshold is discussed in more detail below.

When the threshold is not met (at block 540), the method returns to block 532 to generate responding device scenarios. When the threshold is met (block 540), the method proceeds to block 544 to select one or more of the identified devices to deliver the answer based on the criteria which includes meeting the threshold.

For example, the threshold being met can include rating response scenarios, such as rating using a device closest to the requesting user as the highest priority based on the factors of determining a location of the requesting user, and the locations of identified and registered devices. When the method and system determines a device closest to the requesting user, the threshold is met, and the method initiates responding using the device.

The user location can be determined, with permission of the user, by a user device, e.g., mobile device, the user has on their person, and using GPS (Global Positioning System), or alternatively or in conjunction with, a short distance communication. The method can initiate a response using one or more devices in a closest geographical proximity to the location of the user when the request was received, or where the requesting user is located presently, or at a designated time.

The method includes responding, via the control system, using the selected device by generating an audible communication with the selected answer (or referred to as the final answer 624 (See FIG. 7)) which communicates a response to the user, as in block 548.

More specifically referring to the criteria and threshold of the present disclosure, generated response scenarios and rating of the responding device scenarios, the system and method of the present disclosure uses the control system to determine at least, but not limited to, location situations or scenarios for responding to the request or instruction.

In examples, which can be included as criteria for ranking to meet a threshold, the method and system includes determining a location of the requesting user, by location tracking a device of the requesting user. The method and system of the present disclosure can further include determining a location for the device which received the request or instruction. In another example, the method and system can further include determining when the requesting user is in proximity of the device which received the request or instruction. Another example includes determining when the requesting user is in proximity to one or more other identified devices. In yet another example the system and method can include determining when the requesting user is in motion, and determining which of the identified devices the requester is approaching or in proximity to.

In another example, the method and system includes determining response scenarios of: a first scenario when the user is in the proximity of the device which received the request; determining a second scenario when the user is in the proximity of another device of the identified devices; determining a third scenario when the user is in motion, and selecting a device in proximity to the user in motion; determining a fourth scenario when a device and associated AI system is better capable of providing an answer to the request; determining a fifth scenario when the requesting user is with other users, and when using multiple devices to respond to the request is warranted; determining a sixth scenario when using multiple devices in proximity to respective multiple users to respond to the request is warranted; and selecting one or more of the scenarios for a response based on the rating of the responding device scenarios of the criteria for the order of importance.

In another example included in the criteria, the method and system includes a scenario determining when multiple users initiated a second request; determining when all the multiple users are in the proximity of one device; and selecting the one device to respond to the second request.

In another example included in the criteria, the method and system includes a scenario determining when multiple users initiated a second request; determining when one or more of the multiple users are in proximity to multiple devices; and selecting multiple devices to respond to the second request.

In one embodiment of the present disclosure, a first AI system which receives the request or instruction, can electronically initiate information requests to secondary AI systems. The first AI system being part of the system 400 and method 500 of the present disclosure. The AI systems can be defined as a group, and the method can use the secondary AI systems to respond to the request. After reviewing the scenarios, and having determined a ranking of the scenarios. The first AI system can rank the responding scenarios to provide a response and initiate an audible reply.

As described above in embodiments of the present disclosure, the method and systems of the embodiments described herein can share knowledge between multiple IoT (Internet of Things) enabled smart devices linked to multiple AI engines or systems by identifying devices that can share data, and use one or more devices to respond to the request. Based on the highest ranking response scenario, the method and system includes responding to the response using the highest ranking scenario.

In one example, the embodiments of the present disclosure can include where two people are at home and one of the persons asks a question received by a device associated with one of three AI systems/devices. The question could be, for example, how to cook something, a specific recipe, or baking recipe, or a question about traffic to a location, or weather at a location. In the example of a recipe, a refrigerator in the house on one AI system can have a list of items in the refrigerator, and another AI system can have a preferred recipe. Cooperation between the two AI systems, as in the embodiments of the present disclosure, can provide an answer to the question of—'do I have the ingredients for my favorite recipe'. The present disclosure provides a technique for collaboration and cooperation between multiple AI systems, and provides a response using a selected device, which can be different than the device that received the question, and a different associated AI system or platform.

In one example, priority of response scenarios can include a highest priority for the device that received the request and the requesting user in physical proximity to the receiving device. A next level of priority for a response scenario where secondary devices are used to respond to the user who initiated the request (also referred to as the requester). A next level of priority for secondary notifications for identified user/individuals that were at the original request, that is located in the proximity to the device which received the request (such data can be stored in the control system). In one example, when no other individuals who were in the proximity of the requesting device are in close proximity, a device will be selected from each individual's registered devices (personal devices used over shared devices). Such information can be stored in the control system as registered devices with approval of the users. In a next level of priority for a response scenario, when more than individual is in close physical proximity to each other, a device can be selected in proximity to the group In other example response scenarios, the response communication can change mid-communications to different devices (e.g., as a person moves throughout a house), thus resulting in response communications using multiple devices.

As discussed above in embodiments of the present disclosure, a computer enabled system and method can generate an answer from an AI system by identifying registered devices that can be used to share information to respond to a request. The system and method can communicate with one or more registered devices or systems to respond to the original request or question. A response is communicated based on a criteria and threshold for determining a device (of the registered devices) to deliver the answer. The criteria can include response scenarios which are rated by priority for determining a response device or devices. In one example of responding using multiple devices, a device can be selected for delivering an answer, and a second user can request the answer be sent to them as well. The second user's location can be assessed using GPS, and a device in proximity to the second user used to deliver the answer.

Additionally, one or more users move throughout a house or there are multiple people wearing different devices or holding different devices, for example, the device that received the request does not have to be the device that responds. Different devices and AI systems can each have different operating systems and learning techniques or processes, and the AI system can automatically be learning based on the usage pattern of a particular device. The learning pattern of an AI systems can be dependent on different types of parameters that were considered during the learning process, types of scenarios which were addressed by the device, and the amount of learning, as well as other parameters. The result can be that different devices of the same category can learn differently if the learning parameters are different, and/or if the scenarios addressed are different, or the AI algorithm is different. Therefore, in any multi-AI device scenario, there is a need for a method and system by which the AI devices, and respective systems, can collaborate with each other and provide a best possible decision or answer can be identified by cooperating AI devices. Additionally, in any multi-AI device scenario, there is a need for a method and system by which the AI devices, and respective systems, are determined and selected to respond with the answer or deliver the answer.

Figure 8:
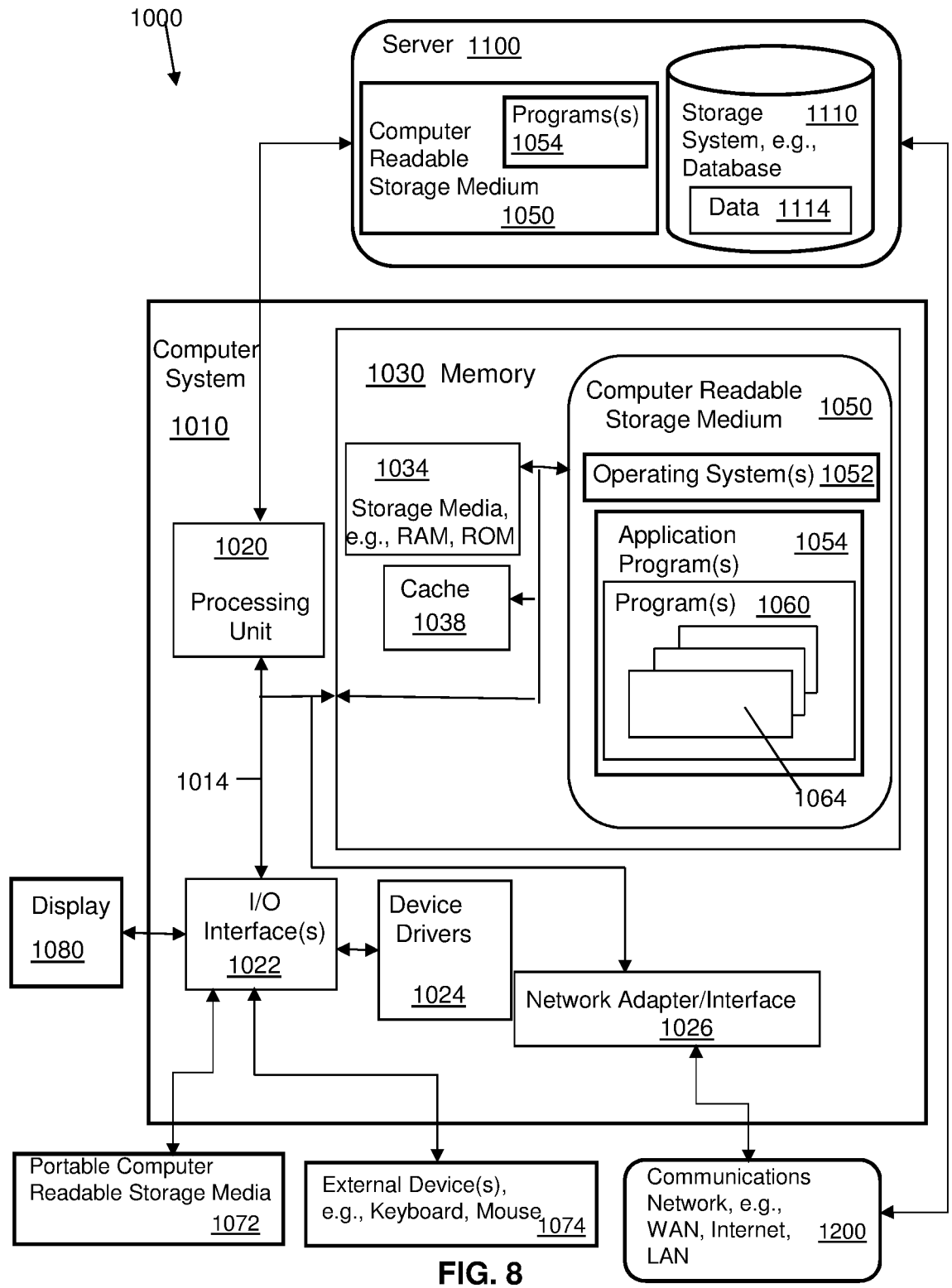
FIG. 8 is a schematic block diagram depicting a computer system according to an embodiment of the disclosure which may be incorporated, all or in part, in one or more computers or devices shown in FIGS. 1 and 5, and cooperates with the system and methods shown in FIGS. 5, 6 and 7.

The computer system in the system 10 and discussed herein, such as computers 62 and 72 in FIGS. 1 and 5, or a remote server, can include all or part of a computer system 1000 and computer 1010 shown in FIG. 8, which discloses a generic computer system 1000 and computer 1010. It is understood that the above disclosed computers/computer systems and the computer 1010 are representative or illustrative of many alternative computer devices and are presented here as generic representations for the purposes of the embodiments of the present invention. In the embodiment discussed above, for illustrative purposes, the method of the present disclosure can be embodied in a computer program 1060 (FIG. 8) or a software application stored on the computer 1010. The computer 1010 can all or in part represent a computer, for example, the computers 62 and 72 in FIGS. 1 and 5. The computers, in FIGS. 1 and 5, can be local or remote computers or servers which can embody a program incorporating the method of the present disclosure, however, in other embodiment in accordance with the present disclosure, a computer program embodying the present method can be part of a computer system running locally in one or more of the illustrated components of the system 10 and 400 shown in FIGS. 1 and 5 (as was discussed hereinabove). Further, a computer program embodying the present method can be cloud based or part of a cloud environment. In one embodiment such a cloud based system or environment can include all or part of the computer system 1000 (FIG. 8) and cloud based environment components shown in FIGS. 10 and 11. Alternative embodiments can include a computer program stored remotely (for example, on a remote server 1100 (FIG. 8)), and, for example, can be implemented as a service.

Referring to FIG. 8, a system or computer environment 1000 includes a computer system 1010 shown in the form of a generic computing device. The method 100, for example, may be embodied in a program 1060 embodied on a computer readable storage device, for example, generally referred to as memory 1030 and more specifically, computer readable storage medium 1050. For example, memory 1030 can include storage media 1034 such as RAM (Random Access Memory) or ROM (Read Only Memory), and cache memory 1038. The program 1060 is executable by the processor 1020 of the computer system 1010 (to execute program steps, code, or program code). Additional data storage may also be embodied as a database 1110 which includes data 1114. The computer system 1010 and the program 1060 shown in FIG. 8 are generic representations of a computer and program that may be local to a user, or provided as a remote service (for example, as a cloud based service), and may be provided in further examples, using a website accessible using the communications network 1200 (e.g., interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in FIG. 8 as program modules 1064. The program 1060 and program modules 1064 can execute specific steps, routines, sub-routines, instructions or code, of the program.

The method of the present disclosure can be run locally on a device such as a mobile device, or can be run a service, for instance, on the server 1100 which may be remote and can be accessed using the communications network 1200. The program or executable instructions may also be offered as a service by a provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

More specifically, as shown in FIG. 8, the system or computer environment 1000 includes the computer system 1010 shown in the form of a general-purpose computing device with illustrative periphery devices. The components of the computer system 1010 may include, but are not limited to, one or more processors or processing units 1020, a system memory 1030, and a bus 1014 that couples various system components including system memory 1030 to processor 1020.

The bus 1014 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 1010 can include a variety of computer readable media. Such media may be any available media that is accessible by the computer 1010 (e.g., computer system, or server), and can include both volatile and non-volatile media, as well as, removable and non-removable media. Computer memory 1030 can include additional computer readable media in the form of volatile memory, such as random access memory (RAM) 1034, and/or cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention.

The method 500 (FIG. 6) (and methods shown in FIGS. 2 and 3), for example, may be embodied in one or more computer programs, generically referred to as a program 1060 and can be stored in memory 1030 in the computer readable storage medium 1050. The program 1060 can include program modules 1064. The program modules 1064 can generally carry out functions and/or methodologies of embodiments of the invention as described herein. The one or more programs 1060 are stored in memory 1030 and are executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via the Input/Output (I/O) interfaces 1022. Still yet, the computer 1010 can communicate with one or more networks 1200 such as a local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, microwave transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

Figure 9:
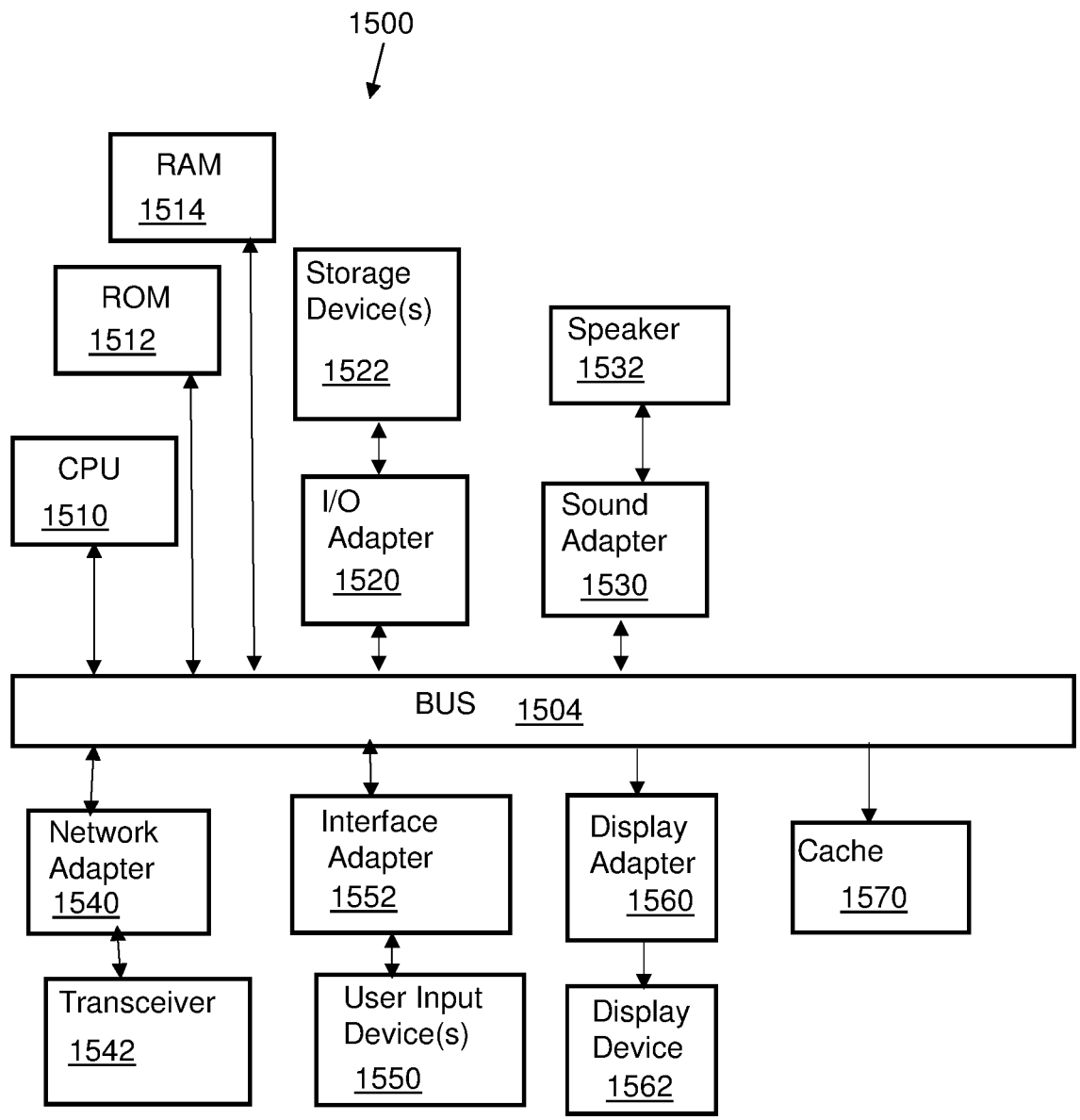
FIG. 9 is a schematic block diagram of a system depicting system components interconnected using a bus. The components for use, in all or in part, with the embodiments of the present disclosure, in accordance with one embodiment of the present disclosure.

Referring to FIG. 9, an example system 1500 for use with the embodiments of the present disclosure is depicted. The system 1500 includes a plurality of components and elements connected via a system bus 1504 (also referred to as a bus). At least one processor (CPU) 1510, is connected to other components via the system bus 1504. A cache 1570, a Read Only Memory (ROM) 1512, a Random Access Memory (RAM) 1514, an input/output (I/O) adapter 1520, a sound adapter 1530, a network adapter 1540, a user interface adapter 1552, a display adapter 1560 and a display device 1562, are also operatively coupled to the system bus 1504 of the system 1500.

One or more storage devices 1522 are operatively coupled to the system bus 1504 by the I/O adapter 1520. The storage device 1522, for example, can be any of a disk storage device (e.g., a magnetic or optical disk storage device), a solid state magnetic device, and so forth. The storage device 1522 can be the same type of storage device or different types of storage devices. A speaker 1532 is operatively coupled to system bus 1504 by the sound adapter 1530. A transceiver 1542 is operatively coupled to system bus 1504 by the network adapter 1540. A display 1562 is operatively coupled to the system bus 1504 by the display adapter 1560.

One or more user input devices 1550 are operatively coupled to the system bus 1504 by the user interface adapter 1552. The user input devices 1550 can be, for example, any of a keyboard, a mouse, a keypad, an image capture device, a motion sensing device, a microphone, a device incorporating the functionality of at least two of the preceding devices, and so forth. Other types of input devices can also be used, while maintaining the spirit of the present invention. The user input devices 1550 can be the same type of user input device or different types of user input devices. The user input devices 1550 are used to input and output information to and from the system 1500.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
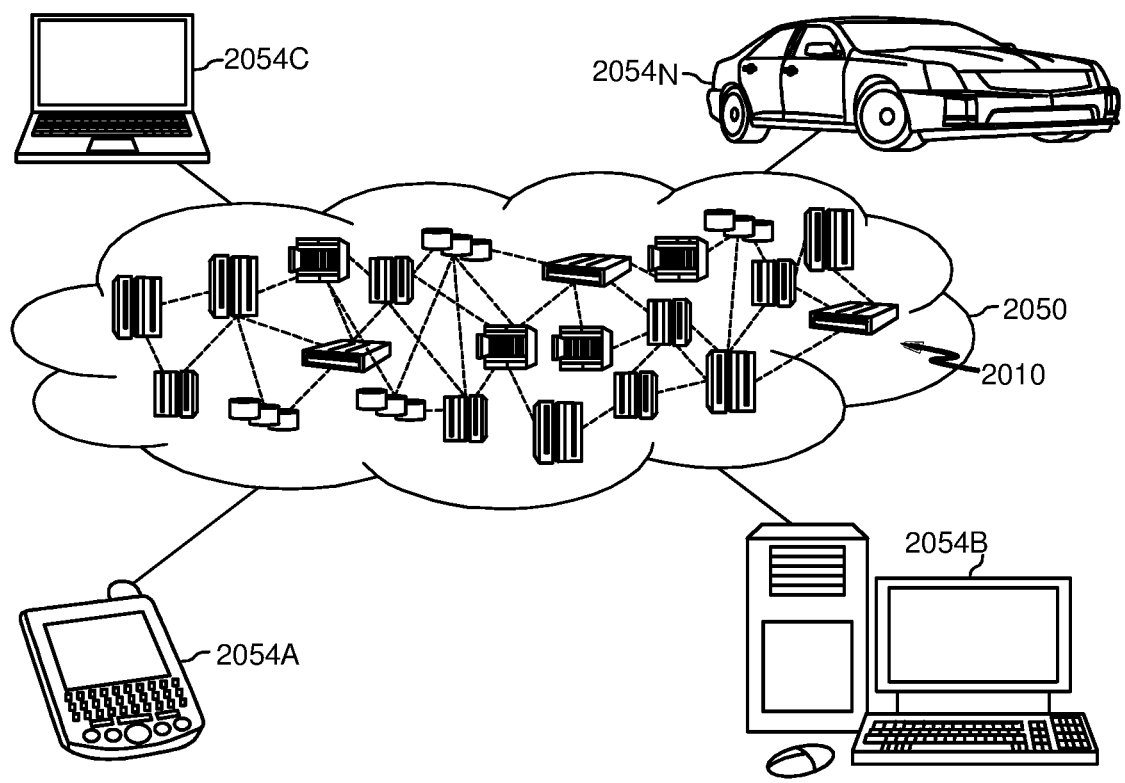
FIG. 10 is a block diagram depicting a cloud computing environment according to an embodiment of the present invention.

Referring now to FIG. 10, illustrative cloud computing environment 2050 is depicted. As shown, cloud computing environment 2050 includes one or more cloud computing nodes 2010 with which local computing devices used by cloud consumers, such as, for example, personal digital assistant (PDA) or cellular telephone 2054A, desktop computer 2054B, laptop computer 2054C, and/or automobile computer system 2054N may communicate. Nodes 2010 may communicate with one another. They may be grouped (not shown) physically or virtually, in one or more networks, such as Private, Community, Public, or Hybrid clouds as described hereinabove, or a combination thereof. This allows cloud computing environment 2050 to offer infrastructure, platforms and/or software as services for which a cloud consumer does not need to maintain resources on a local computing device. It is understood that the types of computing devices 2054A-N shown in FIG. 10 are intended to be illustrative only and that computing nodes 2010 and cloud computing environment 2050 can communicate with any type of computerized device over any type of network and/or network addressable connection (e.g., using a web browser).

Figure 11:
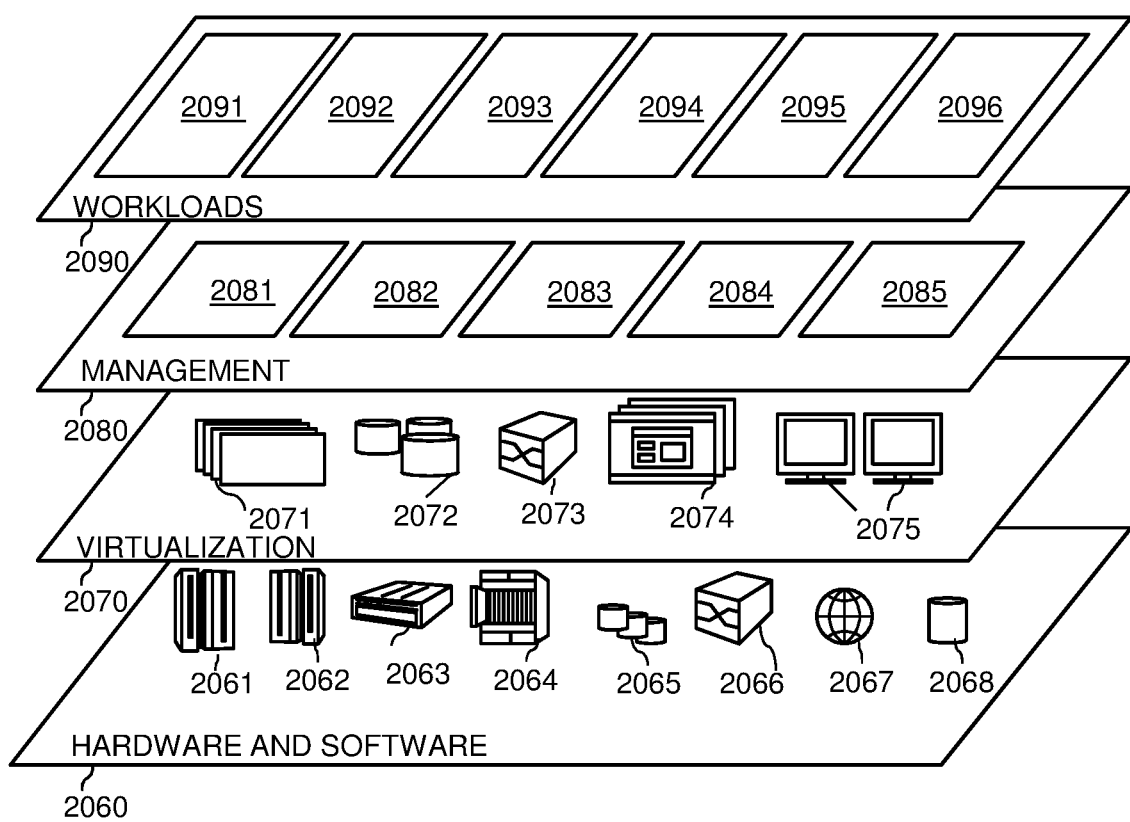
FIG. 11 is a block diagram depicting abstraction model layers according to an embodiment of the present invention.

Referring now to FIG. 11, a set of functional abstraction layers provided by cloud computing environment 2050 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 2060 includes hardware and software components. Examples of hardware components include: mainframes 2061; RISC (Reduced Instruction Set Computer) architecture based servers 2062; servers 2063; blade servers 2064; storage devices 2065; and networks and networking components 2066. In some embodiments, software components include network application server software 2067 and database software 2068.

Virtualization layer 2070 provides an abstraction layer from which the following examples of virtual entities may be provided: virtual servers 2071; virtual storage 2072; virtual networks 2073, including virtual private networks; virtual applications and operating systems 2074; and virtual clients 2075.

In one example, management layer 2080 may provide the functions described below. Resource provisioning 2081 provides dynamic procurement of computing resources and other resources that are utilized to perform tasks within the cloud computing environment. Metering and Pricing 2082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 2083 provides access to the cloud computing environment for consumers and system administrators. Service level management 2084 provides cloud computing resource allocation and management such that required service levels are met. Service Level Agreement (SLA) planning and fulfillment 2085 provide pre-arrangement for, and procurement of, cloud computing resources for which a future requirement is anticipated in accordance with an SLA.

Workloads layer 2090 provides examples of functionality for which the cloud computing environment may be utilized.

Examples of workloads and functions which may be provided from this layer include: mapping and navigation 2091; software development and lifecycle management 2092; virtual classroom education delivery 2093; data analytics processing 2094; transaction processing 2095; and assessing or identifying the purpose and context of a line of people and communicating to user devices the purpose and context of the line 2096.

The descriptions of the various embodiments of the present invention have been presented for purposes of illustration, but are not intended to be exhaustive or limited to the embodiments disclosed. Likewise, examples of features or functionality of the embodiments of the disclosure described herein, whether used in the description of a particular embodiment, or listed as examples, are not intended to limit the embodiments of the disclosure described herein, or limit the disclosure to the examples described herein. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for collaborating among multiple electronically communicating AI (Artificial Intelligence) devices for responding to a request, comprising:
   detecting and identifying devices that are each communicable with a user and electronically communicating and interacting with their respective AI systems;
   generating an answer, in response to receiving a request or an instruction by a user at a device of the identified devices, the answer resulting from collaboration of the identified devices and their respective AI systems;
   determining a responding device from the identified devices based on criteria, the criteria including a location of a requesting user, a location of one of the identified devices, and a threshold for selecting the responding device, the threshold including rating, in an order of importance, responding device scenarios for delivering the answer;
   selecting one of the identified devices to deliver the answer based on the criteria which includes meeting the threshold; and
   responding, using the selected device, by generating an audible communication with the answer which communicates a response to the user.

2. The method of claim 1, further comprising:
   determining a location of the requesting user, by location tracking a device of the requesting user.

3. The method of claim 1, further comprising:
   determining a location for the device which received the request or instruction.

4. The method of claim 1, further comprising:
   determining when the requesting user is in proximity of the device which received the request or instruction.

5. The method of claim 1, further comprising:
   determining when the requesting user is in proximity to one or more other identified devices.

6. The method of claim 1, further comprising:
   determining when the requesting user is in motion, and determining which of the identified devices the requester is approaching or in proximity to.

7. The method of claim 1, further comprising:
   determining a first scenario when the user is in the proximity of the device which received the request;
   determining a second scenario when the user is in the proximity of another device of the identified devices;
   determining a third scenario when the user is in motion, and selecting a device in proximity to the user in motion;
   determining a fourth scenario when a device and associated AI system is better capable of providing an answer to the request;
   determining a fifth scenario when the requesting user is with other users, and when using multiple devices to respond to the request is warranted;
   determining a sixth scenario when using multiple devices in proximity to respective multiple users to respond to the request is warranted; and
   selecting one or more of the scenarios based on the rating of the responding device scenarios of the criteria for the order of importance.

8. The method of claim 1, further comprising:
   determining when multiple users initiated a second request;
   determining when all the multiple users are in the proximity of one device; and
   selecting the one device to respond to the second request.

9. The method of claim 1, further comprising:
   determining when multiple users initiated a second request;
   determining when one or more of the multiple users are in proximity to multiple devices; and
   selecting multiple devices to respond to the second request.

10. A system for collaborating among multiple electronically communicating AI (Artificial Intelligence) devices for responding to a request, the system comprising:
    a computer system comprising: a computer processor, a computer-readable storage medium, and program instructions stored on the computer-readable storage medium being executable by the processor, to cause the computer system to:
    detect and identify devices that are each communicable with a user and electronically communicating and interacting with their respective AI systems;
    generate an answer, in response to receiving a request or an instruction by a user at a device of the identified devices, the answer resulting from collaboration of the identified devices and their respective AI systems;
    determine a responding device from the identified devices based on criteria, the criteria including a location of a requesting user, a location of one of the identified devices, and a threshold for selecting the responding device, the threshold including rating, in an order of importance, responding device scenarios for delivering the answer;
    select one of the identified devices to deliver the answer based on the criteria which includes meeting the threshold; and
    respond, using the selected device, by generating an audible communication with the answer which communicates a response to the user.

11. The system of claim 10, further comprising:
    determining a location of the requesting user, by location tracking a device of the requesting user.

12. The system of claim 10, further comprising:
    determining a location for the device which received the request or instruction.

13. The system of claim 10, further comprising:
determining when the requesting user is in proximity of the device which received the request or instruction.

14. The system of claim 10, further comprising:
determining when the requesting user is in proximity to one or more other identified devices.

15. The system of claim 10, further comprising:
determining when the requesting user is in motion, and determining which of the identified devices the requester is approaching or in proximity to.

16. The system of claim 10, further comprising:
determining a first scenario when the user is in the proximity of the device which received the request;
determining a second scenario when the user is in the proximity of another device of the identified devices;
determining a third scenario when the user is in motion, and selecting a device in proximity to the user in motion;
determining a fourth scenario when a device and associated AI system is better capable of providing an answer to the request;
determining a fifth scenario when the requesting user is with other users, and when using multiple devices to respond to the request is warranted;
determining a sixth scenario when using multiple devices in proximity to respective multiple users to respond to the request is warranted; and
selecting one or more of the scenarios based on the rating of the responding device scenarios of the criteria for the order of importance.

17. The system of claim 10, further comprising:
determining when multiple users initiated a second request;
determining when all the multiple users are in the proximity of one device; and
selecting the one device to respond to the second request.

18. The system of claim 10, further comprising:
determining when multiple users initiated a second request;
determining when one or more of the multiple users are in proximity to multiple devices; and
selecting multiple devices to respond to the second request.

19. A computer program product for collaborating among multiple electronically communicating AI (Artificial Intelligence) devices for responding to a request, the computer program product comprising a computer readable storage medium having program instructions embodied therewith, wherein the computer readable storage medium is not a transitory signal per se, the program instructions executable by a computer to cause the computer to perform a method, comprising:
detecting and identifying devices that are each communicable with a user and electronically communicating and interacting with their respective AI systems;
generating an answer, in response to receiving a request or an instruction by a user at a device of the identified devices, the answer resulting from collaboration of the identified devices and their respective AI systems;
determining a responding device from the identified devices based on criteria, the criteria including a location of a requesting user, a location of one of the identified devices, and a threshold for selecting the responding device, the threshold including rating, in an order of importance, responding device scenarios for delivering the answer;
selecting one of the identified devices to deliver the answer based on the criteria which includes meeting the threshold; and
responding, using the selected device, by generating an audible communication with the answer which communicates a response to the user.

20. The computer program product of claim 19, further comprising:
determining a location of the requesting user, by location tracking a device of the requesting user.

* * * * *